Dec. 22, 1953   E. L. RANSEEN   2,663,218
OPTICAL DEVICE FOR CORRELATING OBSERVER
READING AROUSAL VALUES
Filed Nov. 18, 1949   3 Sheets-Sheet 1
INVENTOR.
Emil L. Ranseen.
BY B. Gordon Allen
Atty.

Dec. 22, 1953  
E. L. RANSEEN  
2,663,218  
OPTICAL DEVICE FOR CORRELATING OBSERVER READING AROUSAL VALUES  
Filed Nov. 18, 1949  
3 Sheets-Sheet 2
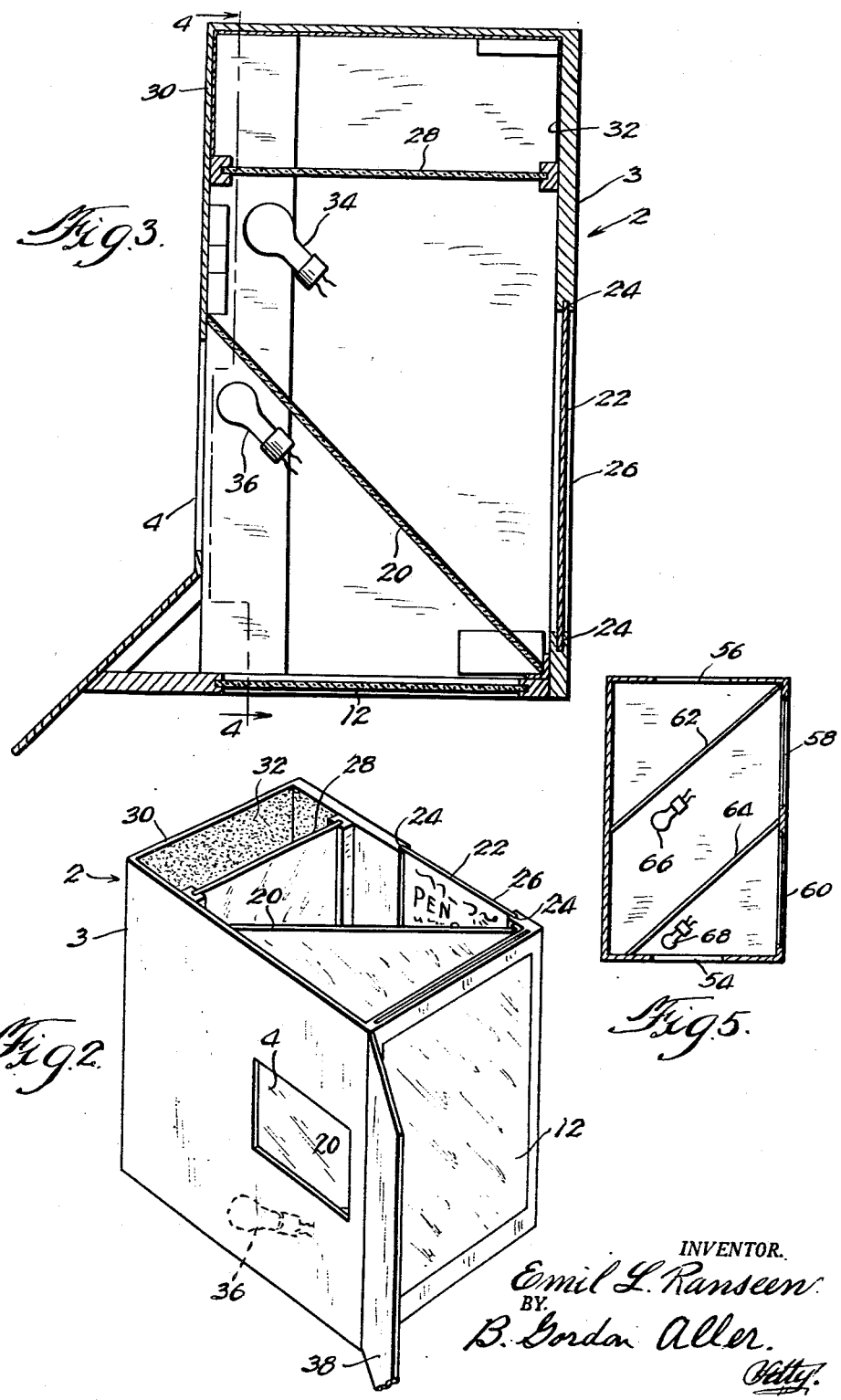
INVENTOR.  
Emil L. Ranseen  
BY  
B. Gordon Allen Dec. 22, 1953     E. L. RANSEEN     2,663,218
OPTICAL DEVICE FOR CORRELATING OBSERVER
READING AROUSAL VALUES
Filed Nov. 18, 1949     3 Sheets-Sheet 3
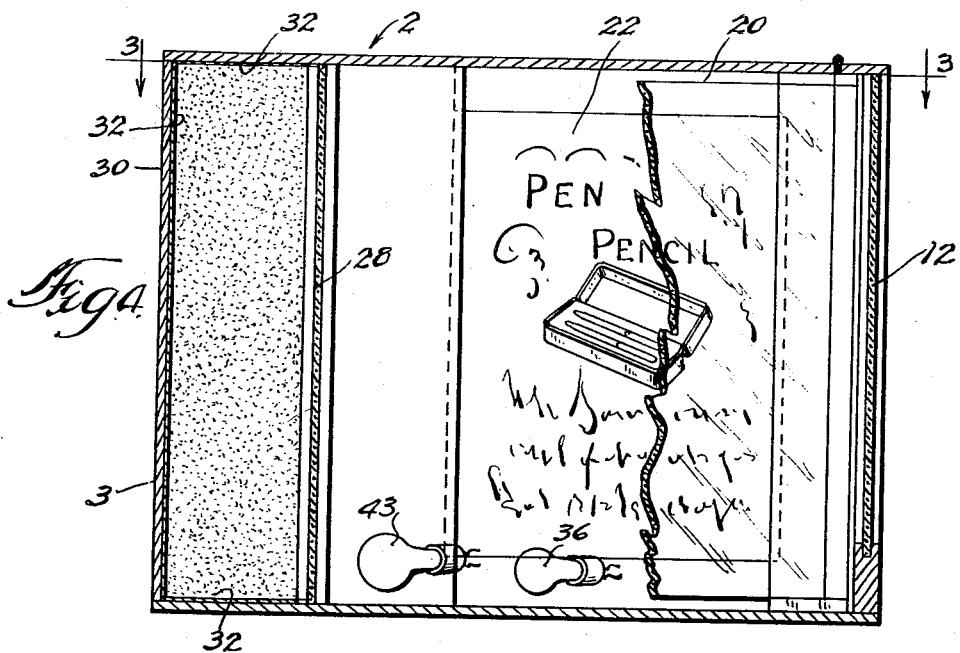
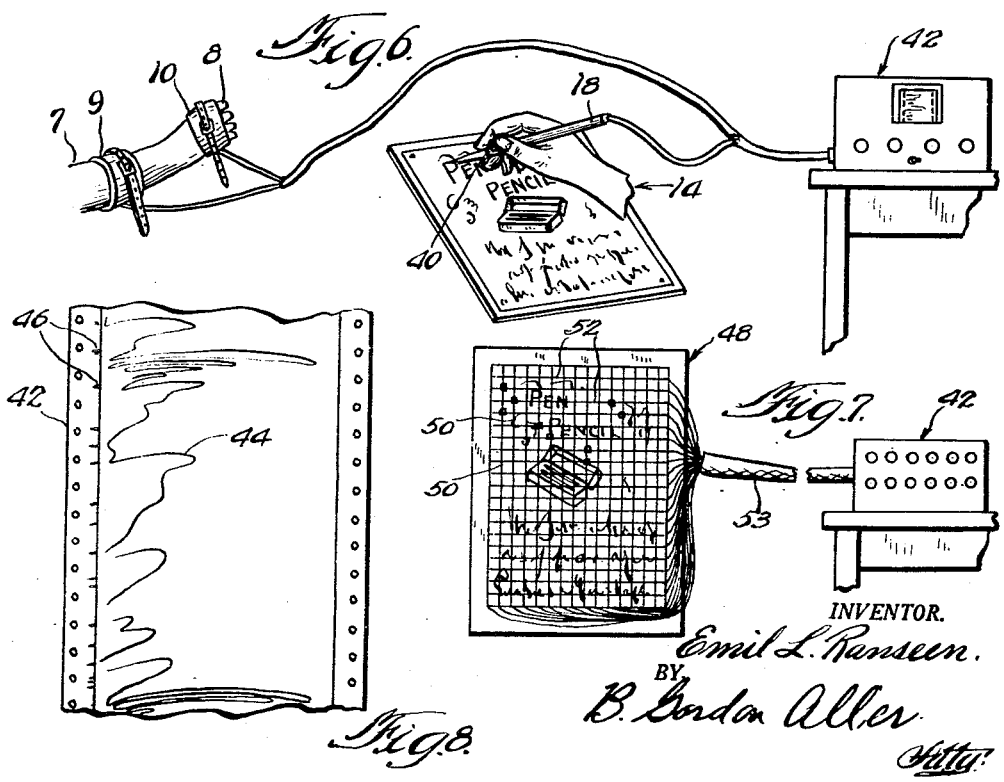
INVENTOR.
Emil L. Ranseen.
BY B. Gordon Allen Patented Dec. 22, 1953

2,663,218

UNITED STATES PATENT OFFICE 2,663,218

OPTICAL DEVICE FOR CORRELATING OBSERVER READING AROUSAL VALUES

Emil L. Ranseen, Chicago, Ill., assignor to Harold L. Feigenholtz, Chicago, Ill.

Application November 18, 1949, Serial No. 128,200

2 Claims. (Cl. 88—20)

This invention relates to apparatus for observing reader interest in visual material under objective conditions and for producing a record of such observations in terms of intellectual and/or physiological arousal.

As is well known in the art, physiological response to visual stimuli can be observed and recorded for the purpose of determining the effectiveness of written text and pictorial illustrations, such as, for example, in advertising copy, styles, models and similar factors. In connection with such studies lingering of attention is accepted as a manifestation of arousal values. In order to obtain true and unaffected results, the subject requires to be observed as objectively as can be done. Toward this end the presence of the observer is advantageously withheld by visual concealment.

It has been found, that when a subject is observing a visual field that contains a number of different elements capable of arousing a physiological response it is necessary to correlate the particular element and the response engendered thereby before a true scientific deduction can be made and arousal factors can be established. By means of such correlation and employing specially prepared visual material, physiological behavior may be studied and analyzed.

It has been discovered that written or pictorial matter can be analyzed with respect to its effectiveness as advertising medium by measuring the time which a subject spends in reading the various portions of advertising copy, noting the eye movements and other behavior of the subject and for some purposes correlating this information with measurement of the subject's physiological responses. In this manner the effective value of advertising copy may be analyzed.

Accordingly a primary object of the present invention is to devise a novel method and means for analyzing the effectiveness of various portions of written and pictorial copy which cause arousal of emotional or other responses in a subject.

A more particular object of the invention is to ascertain, without distracting the subject, what portion of the copy is under examination by the subject at any particular time.

A further object of the present invention is to correlate the part of the material under observation with the physiological or emotional response elicited by the specific material.

A further object of the invention is to measure the time devoted by the subject to examining each portion of the copy.

Another object of the invention is to correlate the time consumed in examining each portion of the copy with the subject's emotional response as the copy is examined.

Another object of this invention is to obtain visual behavior and physiological response records from a number of subjects and by statistical data determine typical sequences of approach, average amount of time spent on each portion and average physiological responses to each such portion or part.

Another object of this invention is to provide an economical method of obtaining a record of the eye travel of a subject which requires no photographic or other recording equipment and is simple to calibrate.

The foregoing and other objects of the invention will become apparent from a consideration of the following specification and the accompanying drawings, wherein:

Fig. 1 is a perspective view of a novel eye correlator used in the practice of the invention, the subject and observer being illustrated in their respective positions;

Fig. 2 is a perspective view of the correlator apparatus on a reduced scale looking downwardly from one corner thereof;

Fig. 3 is a plan sectional view taken on the line 3—3 of Fig. 4;

Fig. 4 is a sectional view on the line 4—4 of Fig. 3;

Fig. 5 is a sectional view corresponding to Fig. 3 but showing a modified apparatus;

Fig. 6 is a diagrammatic pictorial illustration of a device for recording the subject's emotional response and for recording the observer's signals indicating time spent by the subject examining various portions of the copy;

Fig. 7 is a diagrammatic illustration of an electric grid which may be utilized by the observer to indicate progressively the position of the eyes of the subject and to record the viewing time spent on the various portions of the copy; and Fig. 8 is an enlarged fragmentary view of the recorder tape.

Referring first to Fig. 1, the eye correlator generally designated 2 is shown in the form of a housing 3 having a subject's window 4 through which a subject 6 views a test copy. It may be noted that to one arm 7 and hand 8 of the subject are strapped electrodes 9 and 10 for detecting emotional response by recording changes in electrical conductivity.

The correlator 2, as shown in Fig. 1, also comprises an observer's window 12 through which an observer 14 may look at a reflected image of the subject's face as hereinafter discussed in detail. The observer is provided with a duplicate 16 of the copy (which may be reduced in size) within the correlator and is provided with a stylus 18 by which the observer may mark the copy and record the course of scanning as the subject examines various portions of the copy.

By numbering sequentially the points or areas over which the subject's eyes travel over different parts of the copy and by indicating time while each part is under observation by means of a time recorder the sequence of observation and the length of time of observation, may be correlated with the record of physiological response.

Referring now to Figs. 2 to 4, the eye correlator is shown in detail and comprises a transparent mirror 20 through which the subject examines the visual material indicated at 22 mounted in slots 24 at the margins of a copy window 26. Such mirrors are well known in various uses and consist of a supporting transparency such as a pane of glass on one surface of which there has been deposited a finely divided film of reflecting substance. Such a mirror is therefore partially transparent and marginally reflective from both sides of observation.

The correlator 2 also contains a mirror 28 preferably in the form of a pane of ordinary clear glass or similar transparent material behind which is disposed a shadow box 30 containing a dark lining material 32. The mirror 28 thus reflects a dull image of the copy to avoid dominance of the subject's image reflected from the mirror 20.

A faintly illuminated grid may be substituted for the mirror 28. Such an illuminated grid by dividing the space enables the observer better to orient himself with respect to the subject and to better observe the direction of the subject's regard. The observer's window 12 may be completely masked except for a small centrally located window to limit the vision of the observer to the eyes of the subject.

A pair of electric lights 34 and 36 are disposed within the box, light 34 being adapted to illuminate the copy 22 and light 36 being adapted to illuminate the subject's face. Light 34 is directed on copy 22 so that when illuminated the subject 6 at viewing window 4 will be able to see through the transparency 20 notwithstanding its reflecting film. The light 34 thus controls the dominance of penetration over reflection. To the observer, however, the resolution will remain favoring reflection so that through his viewing window 12 he will observe an image of the subject's face illuminated by lamp 36 as well as a subdued image of the copy 22, which is a reflection off the back surface of transparency 20 projected onto shadow box 28 and then penetrating through the transparency 20 in the line of vision of the observer 14.

A diagonal shield or wall 38 is provided at the corner of the correlator 2 between the subject and observer windows 4 and 12 to prevent possible distraction of the subject by the observer.

Thus it will be understood that when both lights 34 and 36 are energized the subject looking through window 4 may examine the copy through the transparent mirror 20 which may be a pane of ordinary clear glass or transparent material but is preferably sprayed with a thin coating of light reflective material, so that the subject may examine the copy through the mirror 20 and the observer may examine the image of the subject's face reflected from the mirror 20. The observer may also see a faint image of the copy reflected from the back surface of the mirror 20 to the pane 28 at the front side of the shadow box 30.

Thus, referring now to Fig. 6, as the subject examines each portion of the copy the observer marks and numbers that portion with the stylus 18 and simultaneously presses a switch 40 thereon, so that the time interval during which the subject examines each portion is recorded by actuation of switch 40 on a conventional recorder 42 which also records the psychogalvanic response of the subject on a moving tape by apparent resistance of electrical current between electrodes 9 and 10 strapped on the subjects arm 7 and hand 8.

As shown in Fig. 8 a tape 42 moving within the recorder device records the response of the subject by the line 44, and the time intervals are shown by the marks 46, so that the subject's response while examining any particular portion of the copy may be ascertained.

It may be noted that the recorder 42 may be any conventional design such as the well known Esterline-Angus recorder, in which a pen (not shown) is actuated across the moving tape by a mechanism response to changes of resistance between the electrodes 9 and 10, the amount of current indicating the degree of emotional response in the subject.

Fig. 7 shows an electrical grid 48 which may optionally be placed across the observer's window 12, said grid comprising spaced longitudinal or vertical strands 50 and spaced transverse or horizontal strands 52 insulated from the longitudinal strands, all of the strands being connected by an insulated cable 53 to the recorder 42. Thus the observer may place his finger on the portion of the grid 48 corresponding to that portion of the copy under examination by the subject, whereupon the transverse strands and longitudinal strands contacted by the observer's finger close an electrical circuit through the finger, recording the position of the subject's eyes as the recorder 42 also records the subject's emotional response.

If desired, the eye correlator 2 may be multiplied to facilitate successive examination of various pieces of copy, and one such arrangement is illustrated in Fig. 5 wherein the subject's window is designated 54 and the observer's window is designated 56, one piece of copy being shown at 58 and another at 60. In this arrangement a pair of transparent mirrors 62 and 64 extend diagonally across the correlator housing between the windows 54 and 56, a pair of lights 66 and 68 being utilized to illuminate the respective pieces 58 and 60 of copy.

Thus if light 66 is energized to illuminate copy 58 with the light 68 deenergized, the subject examines the image of copy 58 reflected from mirror 62 through the window 54; and if light 68 is energized to illuminate copy 60 with the light 66 deenergized the subject examines the image of copy 60 reflected from the mirror 64 through the window 54. In either case the observer looks at the subject's eyes through window 56, transparent mirrors 62 and 64 and window 54, and the subject's psychogalvanic response and eye position are recorded and correlated as above discussed in connection with Figs. 1 to 4 and 6 to 8.

It may be noted that in the modification of Fig. 5 the observer looking through the window 56 can observe the subject's eyes but cannot simultaneously observe an image of the copy as in the embodiment of Figs. 1 to 4.

Changes may be made in form or construction without departing from the spirit of the invention or sacrificing any of its advantages, and the right is hereby reserved to make all changes as fairly fall within the scope of the following claims.

What is claimed as new and desired to be secured by Letters Patent of the United States is as follows:

1. A device of the class described comprising a housing having an observer's window and a subject's window mutually facing each other, said housing having a plurality of supports for visual material, a plurality of transparent, diagonally arranged mirrors in said housing between said windows, each of said mirrors facing the subject's window and one only of the supports and arranged to reflect an image of visual material from said support to the subject's window and lighting means carried and disposed within said housing, said lighting means comprising separate single lighting units for each of said mirrors and supporting units, said single lighting units being adapted to be selectively manipulated whereby the dominance of transparency over reflection respecting said mirrors is controlled.

2. An apparatus for making reader interest observations objectively which comprises, an enclosure housing affording a view aperture for a reader subject, a viewing aperture for an observer laterally perpendicular to the aperture of said reader subject, a planar transparency disposed in said housing at a mutual reflecting angle between said reader subject aperture and said observer aperture, said transparency bearing on one of its surfaces a light-permeable reflecting film, means for supporting reading material in a direct line of vision with the reader subject aperture and on the opposite side of said transparency thereto, means to support an image reflecting surface in a direct line of vision with the observer aperture and on the opposite side of said transparency with respect thereto, and an illumination source directed upon the reading material whereby to produce dominance of visual penetration through said transparency to said reader subject aperture while permitting dominance of visual reflection off said reflecting film of said transparency respecting the image of the reader viewed from said observer aperture.

EMIL L. RANSEEN.

References Cited in the file of this patent

UNITED STATES PATENTS

| Number | Name | Date |
|---|---|---|
| 1,749,090 | Shelby | Mar. 4, 1930 |
| 2,104,552 | Blee et al. | Jan. 4, 1938 |
| 2,229,721 | Brandt | Jan. 28, 1941 |
| 2,311,914 | Tiffin et al. | Feb. 23, 1943 |